US009024169B2

United States Patent
Sumi et al.

(10) Patent No.: US 9,024,169 B2
(45) Date of Patent: May 5, 2015

(54) MUSIC ANALYSIS APPARATUS

(75) Inventors: Kouhei Sumi, Hamamatsu (JP); Takuya Fujishima, Hamamatsu (JP); Takeshi Kikuchi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 144 days.

(21) Appl. No.: 13/559,143

(22) Filed: Jul. 26, 2012

(65) Prior Publication Data
US 2013/0192445 A1    Aug. 1, 2013

(30) Foreign Application Priority Data

Jul. 27, 2011  (JP) .................................. 2011-164058
Jul. 17, 2012  (JP) .................................. 2012-158412

(51) Int. Cl.
G10H 1/00   (2006.01)
G10H 1/18   (2006.01)
G10H 7/00   (2006.01)
G06F 17/30  (2006.01)

(52) U.S. Cl.
CPC .............. *G10H 7/00* (2013.01); *G10H 1/0008* (2013.01); *G10H 2210/066* (2013.01); *G10H 2240/141* (2013.01); *G10H 2240/311* (2013.01); *G10H 2250/015* (2013.01); *G06F 17/30743* (2013.01)

(58) Field of Classification Search
CPC ................. G10H 2210/031; G10H 2210/051; G10H 2210/061; G10H 2210/066; G10H 2210/076; G10H 2240/005; G10H 2240/075; G10H 2240/081; G10H 2240/131; G10H 2240/141
See application file for complete search history.

(56) References Cited

U.S. PATENT DOCUMENTS

| 5,402,339 | A    | 3/1995  | Nakashima et al.           |
|-----------|------|---------|----------------------------|
| 7,642,444 | B2 * | 1/2010  | Fujishima et al. .... 84/618 |
| 7,812,241 | B2 * | 10/2010 | Ellis .................. 84/612 |
| 7,873,521 | B2 * | 1/2011  | Kurozumi et al. ...... 704/270 |
| 8,296,390 | B2 * | 10/2012 | Wood ................... 709/217 |
| 2005/0081702 | A1 * | 4/2005 | Jung .................. 84/616 |
| 2006/0137516 | A1 * | 6/2006 | Kim .................... 84/612 |
| 2007/0051230 | A1 * | 3/2007 | Hasegawa ............... 84/616 |
| 2008/0115658 | A1 * | 5/2008 | Fujishima et al. .... 84/618 |

(Continued)

FOREIGN PATENT DOCUMENTS

| JP | 06-110945 A     | 4/1994  |
|----|-----------------|---------|
| WO | WO-2009/001202 A1 | 12/2008 |
| WO | WO-2009/032794 A1 | 3/2009  |

OTHER PUBLICATIONS

Pardo, B. et al. (2005). "Polyphonic Musical Sequence Alignment for Database Search," *Proceedings of ISMIR*, pp. 215-222.

(Continued)

*Primary Examiner* — Marlon Fletcher
(74) *Attorney, Agent, or Firm* — Morrison & Foerster LLP

(57) ABSTRACT

A music analysis apparatus has a feature extractor and an analysis processor. The feature extractor generates a time series of feature values from a sequence of notes which is designated as an object of analysis. The analysis processor computes an evaluation index value which indicates a probability that the designated sequence of notes is present in each of a plurality of reference music pieces by applying a probabilistic model to the time series of the feature values generated from the designated sequence of notes. The probabilistic model is generated by machine learning of the plurality of reference music pieces using time series of feature values obtained from the reference music pieces.

9 Claims, 4 Drawing Sheets

(56) References Cited

U.S. PATENT DOCUMENTS

| | | | |
|---|---|---|---|
| 2009/0205483 A1* | 8/2009 | Kim | 84/622 |
| 2011/0132173 A1* | 6/2011 | Shishido | 84/602 |
| 2011/0132174 A1* | 6/2011 | Shishido | 84/602 |
| 2011/0132179 A1* | 6/2011 | Saino | 84/622 |
| 2012/0103166 A1* | 5/2012 | Shibuya et al. | 84/616 |
| 2012/0167748 A1* | 7/2012 | Bao et al. | 84/609 |
| 2012/0266743 A1* | 10/2012 | Shibuya et al. | 84/659 |
| 2013/0046536 A1* | 2/2013 | Lu et al. | 704/233 |
| 2013/0192445 A1* | 8/2013 | Sumi et al. | 84/609 |
| 2013/0275421 A1* | 10/2013 | Resch et al. | 707/725 |
| 2014/0020546 A1* | 1/2014 | Sumi | 84/609 |

OTHER PUBLICATIONS

Pickens, J. et al. (2005). "Markov Random Fields and Maximum Entropy Modeling for Music Information Retrieval," *Proceedings of ISMIR*, pp. 207-214.

European Search Report completed Oct. 23, 2012, for EP Patent Application No. 12177982.1, eight pages.

Pickens, J. et al. (2002). "Polyphonic Score Retrieval Using Polyphonic Audio Queries: A Harmonic Modeling Approach," Computer Science Department Faculty publication Series, 2002 IRCAM, located at http://www.scholarworks.umass.edu/cgi/viewcontent. cgi?article=1127&context=cs_faculty_pubs&sei-redir-1 &referer=http://www.google.com/url?sa=t&rct=j &q=audio%20polyphonic%20query&source=web&cd=1&cad=rja &ved=0CcwQFjAA&url=http%3A%2F%2Fscholarworks.umass. edu%2Fcgi%  2Fviewcontent.cgi%3Farticle%3D1127%26contex, last visited Oct. 19, 2012, 11 pages.

Shifrin, J. et al. (Jul. 18, 2002). "HMM-Based Musical Query Retrieval," *JCDL '02 Proceedings of the 2$^{nd}$ ACM/IEEE-CS Joint Conference on Digital Libraries*, pp. 295-300, located at http://www.cs.northwestern.edu/~pardo/publications/shifrin-pardo-meek-birmingham-jcdl02.pdf, last visited Oct. 19, 2012.

Tzanetakis, G. et al. (Oct. 17, 2002). "Pitch Histograms in Audio and Symbolic Music Information Retrieval," 3rd International Conference on Music Information Retrieval (ISMIR 2002), located at http://www.cs.cmu.edu/~gtzant/work/pubs/ismir02gtzan.pdf, last visited Oct. 22, 2012, eight pages.

* cited by examiner

<MEAN RANK>

| FEATURE VECTOR xm | SEGMENTS | SAMPLE 1 | SAMPLE 2 | OVERALL |
|---|---|---|---|---|
| CONDITION 1 ($d_m[1] \sim d_m[12]$) | 7<br>4 | 13.2<br>8.5 | 33.7<br>28.1 | 23.5<br>18.3 |
| CONDITION 2 ($d_m[1] \sim d_m[12] + T_{Nm}$) | 7<br>4 | 6.4<br>4.0 | 28.4<br>21.5 | 17.4<br>12.8 |
| CONDITION 3 ($d_m[1] \sim d_m[12] + BN_m$) | 7<br>4 | 4.8<br>3.6 | 35.3<br>29.1 | 20.1<br>16.4 |
| CONDITION 4 ($d_m[1] \sim d_m[12] + T_{Nm} + BN_m$) | 7<br>4 | 3.0<br>2.1 | 24.1<br>20.4 | 13.6<br>11.3 |
| COMPARATIVE EXAMPLE | | 6.4 | 74.1 | 39.6 |

FIG.6

<MEAN RECIPROCAL RANK>

| FEATURE VECTOR xm | SEGMENTS | SAMPLE 1 | SAMPLE 2 | OVERALL |
|---|---|---|---|---|
| CONDITION 1 ($d_m[1] \sim d_m[12]$) | 7<br>4 | 0.30<br>0.36 | 0.19<br>0.23 | 0.24<br>0.30 |
| CONDITION 2 ($d_m[1] \sim d_m[12] + T_{Nm}$) | 7<br>4 | 0.43<br>0.45 | 0.28<br>0.26 | 0.36<br>0.36 |
| CONDITION 3 ($d_m[1] \sim d_m[12] + BN_m$) | 7<br>4 | 0.53<br>0.63 | 0.26<br>0.27 | 0.40<br>0.45 |
| CONDITION 4 ($d_m[1] \sim d_m[12] + T_{Nm} + BN_m$) | 7<br>4 | 0.66<br>0.67 | 0.32<br>0.36 | 0.49<br>0.51 |
| COMPARATIVE EXAMPLE | | 0.83 | 0.15 | 0.49 |

MUSIC ANALYSIS APPARATUS

BACKGROUND OF THE INVENTION

1. Technical Field of the Invention

The present invention relates to a technology for analyzing a correlation between a sequence of notes designated by a user (hereinafter, referred to as a 'designated sequence of notes') and each of a plurality of music pieces, which is suited for search of a music piece including a section corresponding or similar to the designated sequence of notes.

2. Description of the Related Art

A technology for searching a plurality of music pieces (hereinafter, referred to as 'reference music pieces') to locate a music piece including a designated sequence of notes has been proposed. For example, Japanese Patent Application Publication No. 1994-110945 discloses a technology for searching for a music piece including a designated sequence of notes by generating an index that indicates position information and appearance frequency of each note in the reference music pieces and comparing the designated sequence of notes with the index in response to a user instruction.

However, Japanese Patent Application Publication No. 1994-110945 has problems in that a target music piece cannot be searched with high accuracy when the user designates a wrong note or a designated sequence of notes that is arranged differently from the reference music pieces is provided, because the technology described in Japanese Patent Application Publication No. 1994-110945 searches music pieces on the basis of whether the designated sequence of notes is present in indexes.

SUMMARY OF THE INVENTION

In view of this, an object of the present invention is to achieve music analysis (particularly, music search) robust against an error in the designated sequence of notes.

The invention employs the following means in order to achieve the object. Although, in the following description, elements of the embodiments described later corresponding to claimed elements of the invention are referenced in parentheses for better understanding, such parenthetical reference is not intended to limit the scope of the invention to the embodiments.

A music analysis apparatus according to the invention comprises: a feature extractor (for example, a feature extractor $22$) configured to generate a time series of feature values (for example, a series of feature vectors xm) from a sequence of notes which is designated as an object of analysis; and an analysis processor (for example, an analysis processor $26$) configured to compute an evaluation index value (for example, an evaluation index value SC[n]) which indicates a probability that the designated sequence of notes is present in each of a plurality of reference music pieces by applying a probabilistic model to the time series of the feature values generated from the designated sequence of notes, the probabilistic model being generated by machine learning of the plurality of reference music pieces using time series of feature values obtained from the reference music pieces.

In this configuration, the evaluation index value that stochastically indicates a correlation between each reference music piece and the designated sequence of notes is computed by applying the probability model, which is generated by machine learning using the time series of feature values of the plurality of reference music pieces, to the time series of the feature values extracted from the designated sequence of notes. Accordingly, it is possible to achieve music analysis (particularly, music search) robust against an error in the designated sequence of notes.

In a preferred aspect of the present invention, the feature extractor is configured to divide the designated sequence of notes along a time axis into a plurality of unit periods so as to generate each feature value from each unit period which contains one or more of notes belonging to one or more of pitch classes, and the feature extractor is configured to calculate each sum of durations of notes belonging to each pitch class in the unit period and configured to calculate the feature value of the unit period based on each sum of durations of notes belonging to each pitch class in the unit period.

For example, the feature extractor is configured to divide the designated sequence of notes along a time axis into a plurality of unit periods so as to generate each feature value from each unit period which contains one or more of notes belonging to one or more of pitch classes, and the feature extractor is configured to calculate each sum of durations of notes belonging to each pitch class in the unit period and a total sum of durations of all notes contained in the unit period and configured to calculate each ratio of each sum to the total sum as the feature value (for example, a duration feature value dm[c]) of the unit period.

In this aspect, the feature value that includes the ratio of the sum of durations of the notes corresponding to one pitch class from among a plurality of notes in each unit period to the total sum of durations of the plurality of notes in each pitch class is generated. Accordingly, it is possible to realize music analysis suited even to a case in which reliability with respect to the intensity of each note of the designated sequence of notes is low, compared to a case of using a chroma vector of a sound signal of the designated sequence of notes.

In a preferred aspect of the present invention, the feature extractor is configured to generate the feature value that includes at least one of a pitch of a top note (for example, a top note TNm) among the one or more of notes contained in the unit period and a pitch of a bottom note (for example, a bottom note BNm) among the one or more of notes contained in the unit period.

In this aspect, since the pitches of the top note and bottom note in each unit period are included in the feature value, it is possible to implement high-accuracy music analysis, compared to a configuration in which the feature value includes only a ratio of the sum of durations of notes corresponding to one pitch class in each unit period to the total sum of durations of all notes in the unit period.

In a preferred aspect of the present invention, the feature extractor is configured to divide the designated sequence of notes along a time axis into a plurality of unit periods so that each unit period contains one or more of notes, and the analysis processor is configured to calculate a probability (for example, similarity P [ym=Ln]) that the notes contained each unit period appear in each reference music piece, and configured to compute the evaluation index value for each reference music piece by accumulating the probabilities (for example, similarities P[y1=Ln] to P[yM=Ln]) calculated from the plurality of unit periods.

In this aspect, it is possible to easily compute the evaluation index value for each of the plurality of reference music pieces because the probability that the designated sequence of notes appears in each reference music piece is computed for each unit period and accumulated.

In a preferred aspect of the invention, the plurality of reference music pieces are divided into a plurality of groups and a plurality of probabilistic models are provided in correspondence to the plurality of groups, each probabilistic model being generated by machine learning of the reference music pieces belonging to the corresponding group, and the analysis processor is configured to compute the evaluation index value for each reference music piece belonging to one group by applying the probabilistic model corresponding to the one group to the time series of the feature values generated from the designated sequence of notes.

In this aspect, computational load and memory capacity required for a learning process for generating the probability model can be reduced because the probabilistic model corresponding to each of the plurality of groups obtained by dividing the plurality of reference music pieces is used.

Furthermore, the analysis processor is configured to compute the evaluation index values for the plurality of music pieces belonging to the plurality of groups in parallel to each other such that the plurality of probabilistic models corresponding to the plurality of groups are concurrently applied to the time series of the feature values generated from the designated sequence of notes.

According to the configuration in which the analysis processor simultaneously computes evaluation index values of reference music pieces in the plurality of groups, a time required for music analysis can be reduced, compared to a configuration in which the evaluation index values are sequentially computed for the plurality of groups. A detailed example of this aspect will be described later as a second embodiment.

The music analysis apparatus according to each of the aspects may not only be implemented by dedicated hardware (electronic circuitry) such as a Digital Signal Processor (DSP) but may also be implemented through cooperation of a general operation processing device such as a Central Processing Unit (CPU) with a program. The program according to the invention is executable by the computer to perform music analysis processing comprising: generating a time series of feature values from a sequence of notes which is designated as an object of the music analysis processing; and computing an evaluation index value which indicates a probability that the designated sequence of notes is present in each of a plurality of reference music pieces by applying a probabilistic model to the time series of the feature values generated from the designated sequence of notes, the probabilistic model being generated by machine learning of the plurality of reference music pieces using time series of feature values obtained from the reference music pieces.

According to this program, it is possible to implement the same operation and effect as those of the music analysis apparatus according to the invention. Furthermore, the program according to the invention may be provided to a user through a computer readable non-transitory recording medium storing the program and then installed on a computer and may also be provided from a server device to a user through distribution over a communication network and then installed on a computer.

BRIEF DESCRIPTION OF THE DRAWINGS

FIG. 6 is a table showing an experimental result (mean rank) according to a second embodiment of the invention.

FIG. 7 is a table showing an experimental result (mean reciprocal rank) according to the second embodiment of the invention.

DETAILED DESCRIPTION OF THE INVENTION

<First Embodiment>

Figure 1:
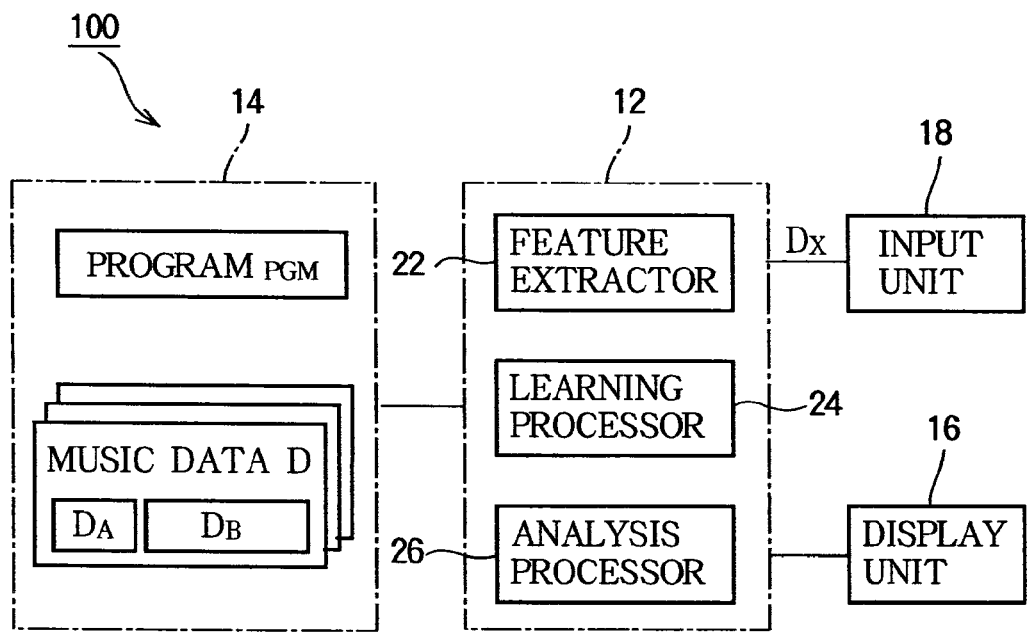
FIG. 1 is a block diagram of a music analysis apparatus according to a first embodiment of the invention.

Referring to FIG. 1, a music analysis apparatus 100 according to a first embodiment of the present invention is a signal processing apparatus that evaluates a musical correlation between a time series of notes designated by a user (designated sequence of notes) and each of a plurality of previously prepared reference music pieces, and is preferably used as a music search apparatus for searching the plurality of reference music pieces to locate a music piece including a section relating (similar or corresponding) to the designated sequence of notes. As shown in FIG. 1, the music analysis apparatus 100 is implemented as a computer system including an execution processing unit 12, a storage unit 14, a display unit 16, and an input unit 18.

The execution processing unit 12 implements a plurality of functions (a feature extractor 22, a learning processor 24, and an analysis processor 26) for analyzing a correlation between the designated sequence of notes and each reference music piece by executing a program PGM stored in the storage unit 14. It is possible to employ a configuration in which the functions of the execution processing unit 12 are distributed across a plurality of integrated circuits or a configuration in which a dedicated electronic circuit (digital signal processor (DSP)) implements some functions.

The storage unit 14 stores the program PGM executed by the execution processing unit 12 and information (for example, music data D) used by the execution processing unit 12. A known storage medium such as a semiconductor storage medium, a magnetic storage medium or the like, or a combination of storage media of a plurality of types can be used as the storage unit 14.

The storage unit 14 according to the first embodiment stores N pieces of music data D corresponding to different reference music pieces. The music data D includes attribute data DA and note sequence data DB. The attribute data DA designates an identification code (for example, a music title) uniquely provided to a music piece and a tempo of the music piece, etc. The note sequence data DB designates a time series of notes constituting a reference music piece (hereinafter, referred to as a 'reference sequence of notes'). For example, time-series data in a MIDI format is preferably employed as the note sequence data DB. The MIDI data is composed of event data that designates the pitch of each note (note number) and instructs sound generation or sound suppression and timing data that designates an event data processing arranged in a time series.

The display unit 16 (for example, a liquid crystal display) displays an image designated by the execution processing unit 12. The input unit 18 receives an instruction from a user, generates note sequence data DX (play data) representing a designated sequence of notes in response to the user instruction, and provides the note sequence data DX to the execution processing unit 12. The input unit 18 according to the first embodiment is an electronic instrument such as a MIDI instrument. Accordingly, time-series data in a MIDI format, like the note sequence data DB of the music data D, is generated as the note sequence data DX.

The operation of the music analysis apparatus 100 according to the first embodiment is largely classified into a learning process and an analysis process. The learning process generates a probabilistic model according to machine learning using N pieces of music data D stored in the storage unit 14 (determines variables of the probabilistic model). The analysis process computes N number of evaluation index values SC[1] to SC[N] corresponding to the reference music pieces by applying the probabilistic model determined by the learning process to the designated sequence of notes of the note sequence data DX. The evaluation index value SC[n] (n=1 to N) is a value (score) based on a probability that the designated sequence of notes indicated by the note sequence data DX corresponds to a sequence of notes in an n-th reference music piece.

Figure 2:
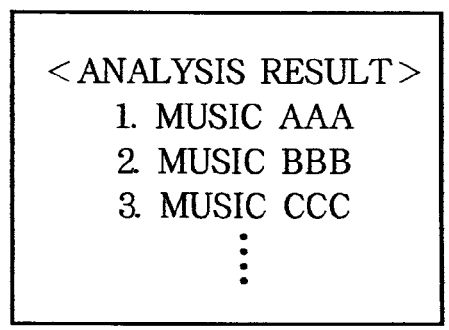
FIG. 2 shows an analysis result obtained by the music analysis apparatus.

Upon completion of the analysis process, a process result shown in FIG. 2 is displayed on the display unit 16. The process result is a list of music titles of reference music pieces indicated by the attribute data DA, which are arranged in descending order of the evaluation index values SC[n] (in a descending order of the probability that the designated sequence of notes is a sequence of notes in the reference music pieces). The user can specify (search) the music title of a reference music piece having a high possibility of containing the designated sequence of notes appointed by the user by viewing the process result shown in FIG. 2. It is possible to display the evaluation indication values SC[n] of the reference music pieces along with the music titles.

The feature extractor 22 shown in FIG. 1 generates a feature vector series X that represents a musical feature of respective sequences of notes (the reference sequence of notes and the designated sequence of notes). In the learning process, the feature extractor 22 generates the feature vector series X from the reference sequence of notes indicated by the note sequence data DB of the music data D stored in the storage unit 14 in the learning process. In the analysis process, the feature extractor 22 generates the feature vector series X from the designated sequence of notes indicated by the note sequence data DX depending on an instruction of the user.

Figure 3:
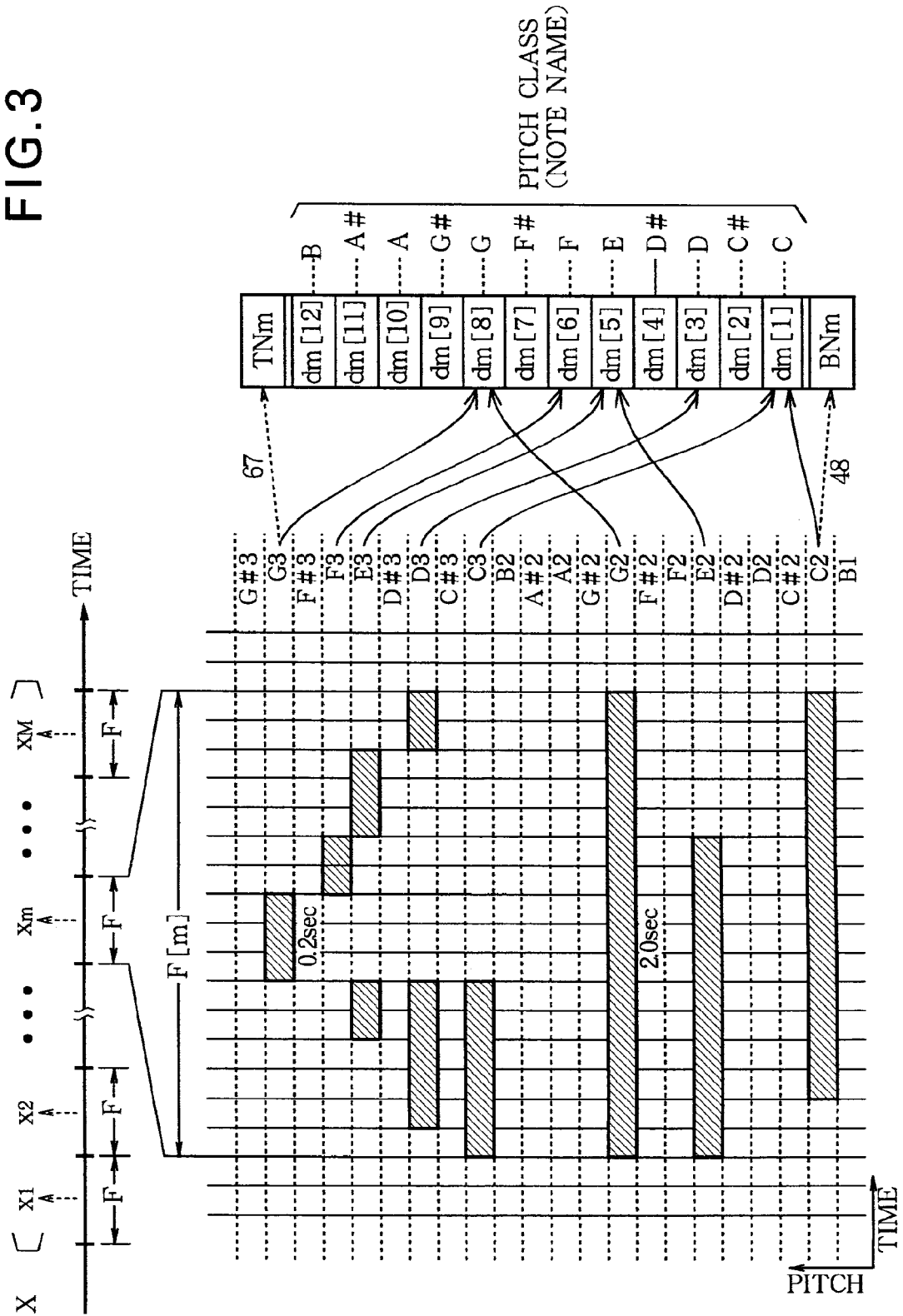
FIG. 3 illustrates a feature vector.

FIG. 3 illustrates the feature vector series X. As shown in FIG. 3, the feature vector series X is a time series of a plurality of (M that is varied with a duration of a sequence of notes) feature vectors x1 to xM corresponding to unit periods F obtained by dividing the sequence of notes along a time axis. The unit period F has a time-length corresponding to one bar of a music piece, for example. Specifically, one bar depending on tempo designated by the attribute data DA of the music data D is set as a duration of the unit period F in the learning process whereas one bar depending on a play tempo designated by the user by operating the input unit 18 is set as the duration of the unit period F in the analysis process. When the tempo is not designated, the feature extractor 22 sets the play tempo and beat to predetermined values and determines a time length corresponding to one bar as the duration of the unit period F on the basis of the set play tempo and beat. For example, if the tempo is 120 BPM (Beats Per Minute) and the beat is four-four time, the unit period F is set to 2 seconds.

FIG. 3 shows a sequence of notes (a piano roll image) set on a plane with a time axis (horizontal axis) and a pitch axis (vertical axis). As shown in FIG. 3, a reference sequence of notes and a designated sequence of notes are note sequences of polyphonic corresponding to a plurality of notes of individual parts (for example, left/right parts or parts of individual instruments). It is noted that each of the reference sequence of notes and the designated sequence of notes can be a time series (monophonic) of notes corresponding to one part.

As shown in FIG. 3, one feature vector Xm corresponding to an m-th (m=1 to M) unit period F in the note sequence is a 14-dimensional vector having 12 duration feature values dm[1] to dm[12] corresponding to different pitch classes (pitch names), a top note TNm, and a bottom note BNm as elements. A pitch class is a set of pitches (note numbers) having a common pitch name. That is, a plurality of pitches having frequencies in a relationship of exponentiation of 2 (that is, a relationship of having a common pitch name at different octaves) belong to a common pitch class. The duration feature values dm[1] to dm[12] are set for the 12 pitch classes respectively corresponding to 12 semi-tones (C, C#, D, D#, E, F, F#, G, G#, A, A#, B).

A duration feature value dm[c] corresponding to a c-th (c=1 to 12) pitch class is a ratio (dm[c]=τa/τb) of the sum τa of durations of notes that belong to the pitch class, from among a plurality of notes present in an m-th unit period F, to the total sum τb of durations of all the notes in the unit period F. The division using the total sum τb is a computation that normalizes the duration feature value dm[c] as a value within a range of 0 to 1. As shown in FIG. 3, when a note with a pitch of G2 (a duration of 2 seconds) and a note with a pitch G3 (a duration of 0.2 seconds), which commonly have a pitch class (pitch name G), are present in the unit period F (τa=2+0.2=2.2) and the total sum τb of the durations of all the notes in the unit period F is 8 seconds, a duration feature value dm[8] corresponding to the pitch class (c=8) of the pitch name G becomes 0.275 ((2+0.2)/8).

The top note TNm in the feature vector Xm is the pitch (note number) of the highest note from among the plurality of notes present in the m-th unit period F of the note sequence. In the unit period F shown in FIG. 3, since the pitch G3 corresponds to the highest note, the top note TNm is set to note number '67' corresponding to the pitch G3. On the other hand, the bottom note BNm in the feature vector Xm is the pitch of the lowest note from among the plurality of notes present in the m-th unit period F of the note sequence. In the unit period F shown in FIG. 3, the pitch C2 corresponds to the lowest note, and thus the bottom note BNm is set to note number '48' corresponding to the pitch C2.

Figure 4:
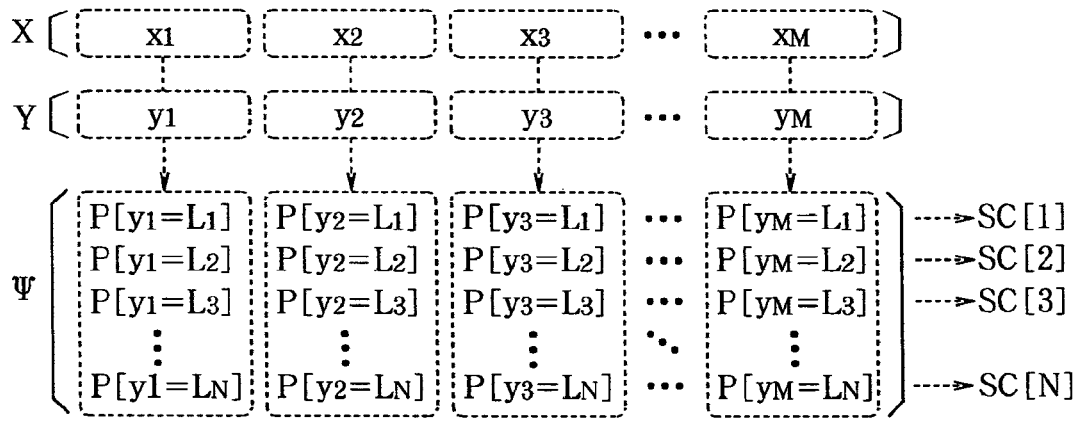
FIG. 4 illustrates a feature vector series and a music label series.

The learning processor 24 shown in FIG. 1 generates a probabilistic model for computing a probability that a specific music label series Y appears under the condition that the feature vector series X (X={x1, x2, . . . , xM}) is observed according to machine learning using N number of feature vector series X extracted by the feature extractor 22 from reference music pieces and N number of music label series Y corresponding to the feature vector series X. As shown in FIG. 4, the music label series Y includes a time series of M label variables y1 to yM which correspond to feature vectors x1 to xM of the feature vector series X. An m-th label variable ym of the music label series Y applied to the learning process is set to one of N labels L1 to LN corresponding to the reference music pieces. The label Ln is an identification code (a music title) of the n-th reference music piece from among N number of reference music pieces. In the music label series Y corresponding to the feature vector series X of the n-th reference music piece, the M label variables y1 to yM are set to the label Ln of the reference music piece.

The probabilistic model generated by the learning processor 24 according to the first embodiment of the invention is an identification model using conditional random fields (CRF). The probabilistic model of CRF defines a conditional probability P(Y|X) that the music label series Y (Y={y1, y2, . . . , yM}) is observed when the feature vector series X (X={x1, x2, . . . , xM}) is observed according to the following expression (1).

$$P(Y|X) = \frac{1}{Z_X} \exp\left(\sum_{m=1}^{M} \sum_{k} \lambda_k f_k(y_{m-1}, y_m, X)\right) \quad (1)$$

Here, $f_k(\ )$ denotes a k-th (k=1 to K) feature function from among K feature functions $f_1(\ )$ to $f_K(\ )$ for mapping each feature vector xm of the feature vector series X, and $\lambda_k$ denotes a weight of the feature function $f_k(\ )$. $Z_X$ represents an element (referred to as a 'normalization factor' hereinafter) for normalizing the conditional probability P(Y|X) as a value within a range from 0 to 1, which is defined by the following expression (2).

$$Z_X = \sum_{Y' \in \{L_1, \ldots L_N\}} \exp\left(\sum_{m=1}^{M} \sum_{k} \lambda_k f_k(y'_{m-1}, y'_m, X)\right) \quad (2)$$

Each of the K feature functions $f_1()$ to $f_K()$ applied to the probabilistic model of the first embodiment is a function (mapping function) that transforms the feature vector series X generated by the feature extractor 22 to the following elements (1) to (7), for example.

(1) Probability density of M duration feature values dm[c] of a c-th pitch class in the M feature vectors x1 to xM of the feature vector series X (2) Joint probability density of duration feature values dm[c], dm[c+4] and dm[c+7] of major triad having one pitch class as a fundamental note in each of the M feature vectors x1 to xM of the feature vector series X (3) Joint probability density of duration feature values dm[c], dm[c+3] and dm[c+7] of minor triad having one pitch class as a fundamental note in each of the M feature vectors x1 to xM of the feature vector series X (4) Frequency of matching of each pitch (note number) to the top note TNm in the M unit periods F (5) Frequency of matching of each pitch to the bottom note BNm in the M unit periods F (6) Frequency of generation of a combination of the top notes TNm and TNm−1 in the M unit periods F (7) Frequency of generation of a combination of the bottom notes TNm and TNm−1 in the M unit periods F 12 feature functions $f_k()$ corresponding to different pitch classes are designated in the case of (1) to (3) and one feature function $f_k()$ is designated in the case of (4) to (7). Accordingly, the total number of feature functions $f_k()$ is 40 (K=40) in the first embodiment. The learning processor 24 sets the probability model by determining the weight $\lambda_k$ of expression (1) according to learning process using the feature vector series X (X={x1, x2, ..., xM}) and the music label series Y (Y={y1, y2, ..., yM}).

Now, a feature vector F(Y,X) (F(Y,X)={F1(Y,X), F2(Y,X), ..., FK(Y,X)} having K variables F1(Y,X) to FK(Y,X) as elements and a weight vector $\Lambda$ ($\Lambda$={$\lambda 1, \lambda 2, \ldots, \lambda K$}) having K weights 1 to K as elements are introduced. A k-th variable $F_k$(Y,X) of the feature variable F(Y,X) is defined as the following expression (3).

$$F_k(Y, X) = \sum_{m=1}^{M} f_k(y_{m-1}, y_m, X) \quad (3)$$

Accordingly, the conditional probability P(Y|X) is transformed into the following expression (4).

$$P(Y \mid X) = \frac{1}{Z_X} \exp(\Lambda \cdot F(Y, X)) \quad (4)$$

Considering a case in which the learning process is performed on the probabilistic model such that a log likelihood $\Pi$ of the conditional probability P(Y|X) of expression (4) is maximized using the feature vector series Xn (X1 to XN) and music label series Yn (Y1 to YN) corresponding to N reference music pieces, the log likelihood $\Pi$ is represented by the following expression (5).

$$\prod = \sum_{n} \log P(Y_n \mid X_n) = \sum_{n} [\Lambda \cdot F(Y_n, X_n) - \log Z_{X_n}] \quad (5)$$

As represented by expression (6), the log likelihood $\Pi$ reaches a maximum value when gradient $\nabla\Pi$ of the log likelihood $\Pi$ of expression (5) is zero.

$$\nabla \prod = \sum_{n} [F_k(Y_n, X_n) - E_{P(Y_n, X_n)} F_k(Y, X_n)] = 0 \quad (6)$$

In expression (6), $E_{p(Y_n, X_n)} F_k(Y, X_n)$ denotes an expected value and is represented by the following expression (7) using the forward-backward algorithm.

$$E_{P(Y_n, X_n)} F_k(Y, X_n) = \quad (7)$$

$$\sum_{y} P(y \mid X) F(y, X) = \sum_{y', y} \frac{\alpha_{y'} \cdot f_k^* \exp\left(\sum_{k'} \lambda_{k'} f_{k'}^*\right) \cdot \beta_y}{Z_X}$$

In expression (7), $f_k^*$ denotes a feature function $f_k(y',y,X)$ and y and y' represent neighboring variables y in the music label series Y. L(y) denotes a series of labels on the left (in front) of the label of the variable y and R(y) represents a series of labels on the right (at the back) of the label of the variable y. In addition, $\alpha y$ is a cost vector represented by the following expression (8) and $\beta y$ is a cost vector represented by the following expression (9).

$$\alpha_y = \sum_{y' \in L(y)} \alpha_{y'} \cdot \exp\left(\sum_{k} \lambda_k f_k(y', y, X)\right) \quad (8)$$

$$\beta_y = \sum_{y' \in R(y)} \beta_{y'} \cdot \exp\left(\sum_{k} \lambda_k f_k(y, y', X)\right) \quad (9)$$

When the log likelihood $\Pi$ is normalized with Gaussian priori probability in order to prevent over fitting, the log likelihood $\Pi$ is represented by the following expression (10).

$$\prod = \sum_{n} \log P(Y_n \mid X_n) - \frac{1}{2} \sum_{k} |\lambda_k|^2 \quad (10)$$

Accordingly, the gradient $\nabla\Pi$ of the log likelihood $\Pi$ is represented by the following expression (11).

$$\nabla \prod = \sum_{n} [F_k(Y_n, X_n) - E_{P(Y_n, X_n)} F_k(Y, X_n)] - \lambda_k \quad (11)$$

The learning processor 24 according to the first embodiment computes the weights $\lambda_k$ ($\lambda_1$ to $\lambda_K$) by applying the feature vector series X (X1 to XN) and the music label series Y (Y1 to YN) of the N reference music pieces to expression (11) such that the gradient VII becomes 0. A known method such as the quasi-Newton method based on limited-memory Broyden-Fletcher-Goldfarb-Shanno (L-BFGS) method is employed to compute the weights $\lambda_k$. The probabilistic model (weights $\lambda_1$ to $\lambda_K$) generated through the above-mentioned procedure is stored in the storage unit 14 and used for the analysis process.

In the analysis process, the feature vector series X of the designated sequence of notes indicated by the note sequence data DX is generated by the feature extractor 22. The analysis processor 26 computes N evaluation index values SC[1] to SC[N] corresponding to different reference music pieces according to the analysis process that applies the probabilistic model (weight $\lambda_k$) generated by the learning processor 24 to the feature vector series X of the designated sequence of notes.

Figure 5:
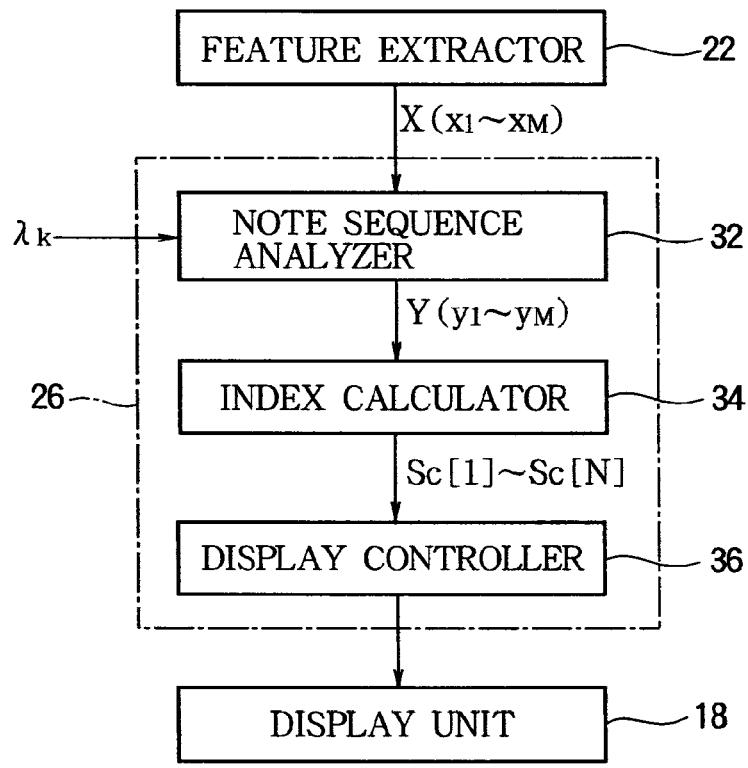
FIG. 5 is a block diagram of an analysis processor.

FIG. 5 is a block diagram of the analysis processor 26. As shown in FIG. 5, the analysis processor 26 includes a note sequence analyzer 32, an index calculator 34, and a display controller 36. The note sequence analyzer 32 generates the music label series Y by applying the feature vector series X (feature vectors x1 to xM) of the designated sequence of notes represented by the note sequence data DX to the probabilistic model. The music label series Y generated by the analysis process includes M similarity series y1 to yM respectively corresponding to the feature vectors x1 to xM of the feature vector series X of the designated sequence of notes.

As shown in FIG. 4, an m-th similarity series of the music label series Y corresponds to an N-dimensional vector having N similarities P[ym=Ln] (P[ym=L1] to P[ym=LN]) respectively corresponding to the reference music pieces as elements. The similarity P[ym=Ln] means a marginal probability (a degree by which a time series of notes in the m-th unit period F from among the designated sequence of notes musically approximates the reference music piece with the label Ln) that the m-th feature vector xm of the designated sequence of notes appears in the reference music piece with the label Ln. That is, the note sequence analyzer 32 computes the similarity P[ym=Ln] depending on a probability that the designated sequence of notes corresponds to a sequence of notes in the reference music pieces for each of the M unit periods F (each of the M feature vectors x1 to xM), which are obtained by dividing the designated sequence of notes. In other words, as shown in FIG. 4, an N×M matrix Ψ (referred to as a 'similarity matrix' hereinafter), in which similarity series ym of the respective unit periods F are arranged as N-order vertical vectors in a horizontal direction, is generated.

A process of the note sequence analyzer 32 to generate the music label series Y (similarity matrix Ψ) by applying the feature vector series X to the probabilistic model will now be described in detail. First of all, the note sequence analyzer 32 sequentially computes M cost vectors αy corresponding to the similarity series ym of the music label series Y by applying the feature vector series X of the designated sequence of notes and the weight $\lambda_k$ computed in the learning process to the above-described expression (8). That is, the cost vector αy corresponding to the m-th similarity series ym (variable y of expression (8)) is computed through calculation of expression (8) having the previous similarity series ym−1 as a variable y'. The cost vector αy corresponding to the similarity series ym is an N-order vector having N coefficients α [ym=L1] to α [ym=LN] corresponding to different reference music pieces as elements. A coefficient α [ym=Ln] means a cost value that maintains a state in which the feature vector xm corresponds to the n-th reference music piece when the previous coefficient α [ym−1=L1] is considered.

Secondly, the note sequence analyzer 32 sequentially computes M cost vectors βy corresponding to the similarity series ym of the music label series Y by applying the feature vector series X of the designated sequence of notes and the weight $\lambda_k$ computed in the learning process to the above-described expression (9). That is, the cost vector βy corresponding to the m-th similarity series ym is computed through calculation of expression (9) having the next similarity series ym+1 as variable y'. The cost vector βy corresponding to the similarity series ym is an N-order vector having N coefficients β [ym=L1] to β [ym=LN] corresponding to different reference music as elements. A coefficient β [ym=Ln] means a cost value that maintains a state in which the feature vector xm corresponds to the n-th reference music when the next coefficient β [ym+1=L1] is considered.

Thirdly, the note sequence analyzer 32 computes the normalization factor $Z_X$ by applying the feature vector series X of the designated sequence of notes and the weight $\lambda_k$ computed in the learning process to the above-mentioned expression (2). In addition, the note sequence analyzer 32 computes a similarity P[ym=Ln] corresponding to the n-th reference music piece in the m-th similarity series ym of the music label series Y by applying each coefficient α [ym=Ln] of the cost vector αy, each coefficient β [ym=Ln] of the cost vector βy, and the normalization factor $Z_X$ to the following expression (12). The method for generating the music label series Y (similarity matrix Ψ) according to the first embodiment has been described.

$$P[y_m = L_n] = \frac{1}{Z_X} \alpha[y_m = L_n] \cdot \beta[y_m = L_n] \quad (12)$$

The index calculator 34 shown in FIG. 5 computes an evaluation index value SC[n] (SC[1] to SC[N]) of each reference music piece from the music label series Y (similarity matrix Ψ) generated by the note sequence analyzer 32. Specifically, as shown in FIG. 4, the evaluation index value SC[n] is a value obtained by accumulating the similarity P[ym=Ln] of the n-th row in each similarity matrix ym of the music label series Y for M similarity series y1 to yM. That is, for the similarity matrix Ψ, the sum of M similarities P[y1=Ln] to P[yM=Ln] that belong to the n-th row is computed as the evaluation index value SC[n]. As is understood from the above description, the evaluation index value SC[n] is as large as the reference music piece including a sequence of notes that corresponds to or is similar to the designated sequence of notes. The display controller 36 generates the list shown in FIG. 2 in which the music titles of reference music pieces are arranged in descending order of the evaluation index values SC[n] computed by the index calculator 34 and controls the display unit 16 to display the list.

In the above-described first embodiment, the evaluation index value SC[n] that stochastically represents the correlation between the designated sequence of notes and each reference music piece is computed by applying the probabilistic model (weight $\lambda_k$) generated by machine learning using the feature vector series X of the N reference music pieces to the feature vector series X of the designated sequence of notes depending on a user instruction. Accordingly, it is possible to obtain a proper analysis result even when an error is present between the designated sequence of notes and the reference sequence of notes (for example, when the user designates a wrong sequence of notes or when a sequence of notes arranged differently from the reference music pieces is designated), as compared to the technology of Japanese Patent Application Publication No. 1994-110945 which determines whether a note designated by a user corresponds to a note in an index. That is, it is possible to achieve music analysis (music search) robust against an error in the designated sequence of notes.

In the first embodiment, since the duration feature values dm[1] to dm[12] depending on the sum τ a of durations of notes corresponding to each pitch class are used for the feature vector xm, it is possible to achieve music analysis robust against an error in the designated sequence of notes, as compared to the technology of Japanese Patent Application Publication No. 1994-110945, which adds only arrangement of pitches of notes.

A chroma vector (for example, an octave profile disclosed in Japanese Patent Publication No. 382666) which is obtained by accumulating intensity of a sound signal for a plurality of octaves for each pitch class can be used as the feature vector xm that represents a musical feature. However, in the note sequence data DB in a MIDI format and the note sequence data DX, a possibility that the intensity (velocity) of each note is not appropriately designated is high, compared to a sound signal containing real play sound. Hence, there is a possibility that the probabilistic model with high reliability is not obtained in the learning process and a possibility that the music label series Y with high reliability is not obtained in the analysis process in a configuration using the chroma vector of the note sequence data DB and the note sequence data DX as the feature vector xm. The duration of each note is likely to be designated comparatively correctly in the note sequence data DB and the note sequence data DX. Therefore, according to the first embodiment, it is possible to generate the probabilistic model with high reliability using the note sequence data DB (reference sequence of notes) and to obtain an analysis result with high reliability using the note sequence data DX (designated sequence of notes), as compared to a case in which the chroma vector is employed as the feature vector xm. Moreover, it is possible to use a chroma vector extracted from a sound signal generated on the basis of the note sequence data DB and the note sequence data DX as the feature vector xm on the assumption that the intensity of each note is appropriately designated in the note sequence data DB and the note sequence data DX.

<Second Embodiment>

A second embodiment of the present invention will now be described. In each embodiment illustrated below, elements whose operations or functions are similar to those of the first embodiment will be denoted by the same reference numerals as used in the above description and a detailed description thereof will be omitted as appropriate.

In the second embodiment, N reference music pieces having music data D stored in the storage unit 14 are classified into Q (Q=N/Ng) music groups each including Ng number of reference music pieces. A method of classifying the reference music pieces into Q music groups is arbitrary. For example, it is possible to employ a method of randomly selecting the N reference music pieces sequentially and distributing the selected N reference music pieces to Q music groups. The music groups may have different numbers Ng of reference music pieces.

In the learning process, the feature extractor 22 generates the feature vector series X from the note sequence data DB of the music data D for each of the N reference music pieces as in the first embodiment. The learning processor 24 individually generates Q number of probabilistic models corresponding to different music groups by performing the same process as the first embodiment for each of the Q music groups. That is, the learning process that generates one probabilistic model (weight $\lambda_k$) from the note sequence data DB of the Ng reference music pieces of one music group is performed on the respective Q music groups.

In the analysis process, the analysis processor 26 computes evaluation index values SC[1] to SC[Ng] for the respective reference music pieces for each of the Q music groups by applying the Q probabilistic models corresponding to different music groups of the reference music pieces to the feature vector series X of the designated sequence of notes. Considering one music group, the process of computing the evaluation index values SC[1] to SC[Ng] using the probabilistic models is performed as in the first embodiment. The analysis processor 26 performs computation of the evaluation index values SC[1] to SC[Ng] (analysis process using probabilistic models) in parallel for the Q music groups. Music titles of the N reference music pieces are displayed on the display unit 16 in descending order of the evaluation index values SC[1] to SC[Ng] for the Q music groups. The second embodiment can obtain the same effect as the first embodiment.

Computational load and memory capacity that are necessary to generate one probabilistic model are proportional to the square ($N^2$ in the first embodiment) of the number of reference music pieces applied to the learning process. In the second embodiment, a probabilistic model is generated for each of the Q music groups obtained by dividing the N reference music pieces. That is, the number Ng of reference music pieces used to generate one probabilistic model is reduced compared to the first embodiment (Ng<N), and thus the second embodiment has the advantage that the computational load and memory capacity necessary for the learning process are lower than those in the first embodiment. Furthermore, since the analysis process is simultaneously performed for the Q music groups in the second embodiment, a time required for the analysis process can be reduced as compared to a case in which the analysis process is sequentially performed for the Q music groups, for example.

Experimental results obtained using the music analysis apparatus 100 according to the second embodiment 100 will be described. In the following description, when a sequence of notes included in a specific music piece (referred to as a 'target music piece' hereinafter) from among N (N=1420) reference music pieces is determined as a designated sequence of notes, the rank of the evaluation index value SC[n] computed for the target music piece is considered. It is evaluated that the analysis accuracy of the music analysis apparatus 100 increases as the rank of the evaluation index value SC[n] of the target music piece increases (as the rank becomes closer to 1). FIG. 6 is a table showing the mean rank obtained through a predetermined number (25) of experiments and FIG. 7 is a table showing the mean reciprocal rank (MRR) obtained through a predetermined number of experiments. As to the mean rank of FIG. 6, it is evaluated that the analysis accuracy increases as the value of the mean rank decreases (becomes closer to 1). In the case of the MRR of FIG. 7, it is evaluated that the analysis accuracy increases as the value of the mean rank increases (becomes closer to 1).

FIGS. 6 and 7 show a case of different contents of the feature vector xm (top note TNm and bottom node BNm), presence or absence of an error in the designated sequence of notes, different numbers (the number of music groups) of segments of the N reference music pieces. The contents of the feature vector xm are set under the following conditions (condition 1 to condition 4). Condition 4 corresponds to the first and second embodiments.

Condition 1: only duration feature values dm[1] to dm[12]

Condition 2: duration feature values dm[1] to dm[12]+top note TNm

Condition 3: duration feature values dm[1] to dm[12]+bottom note TNm

Condition 4: duration feature values dm[1] to dm[12]+top note TNm+bottom note BNm As to the designated sequence of notes, a case (sample 1) using a designated sequence of notes perfectly corresponding to a sequence of notes in the target music piece and a case (sample 2) using a designated sequence of notes some of which are different from a sequence of notes in the target music piece are considered. Results (integrated results) obtained from experiments using the sample 1 and the sample 2 are also shown in FIGS. 6 and 7. In addition, FIGS. 6 and 7 show cases in which the segmenting number Q of the N reference music pieces is 4 and 7.

FIGS. 6 and 7 show the rank (the mean rank and mean reciprocal rank) of the target music piece in a case that the N reference music pieces are ranked on the basis of the distance (cosine distance) between the feature vector xm of a reference sequence of notes of each reference music piece and the feature vector xm of the designated sequence of notes as a comparative example.

As is understood from FIGS. 6 and 7, regarding the comparative examples, the analysis accuracy remarkably decreases when the designated sequence of notes is different from the sequence of notes of the target music piece (sample 2) while the analysis accuracy is high when the designated sequence of notes corresponds to the sequence of notes of the target music piece (sample 1). That is, it is evaluated that the comparative example has low robustness against error in the designated sequence of notes. In accordance with the second embodiment, the analysis accuracy is maintained at a high level when the designated sequence of notes corresponds to the sequence of notes in the target music piece (sample 1). In addition, a sufficiently high analysis accuracy can be achieved, compared to the comparative example, even when the designated sequence of notes is different from the sequence of notes of the target music piece (sample 2). That is, it is possible to achieve music analysis robust against error in the designated sequence of notes according to the second embodiment and the above-mentioned first embodiment.

It is known from FIGS. 6 and 7 that the analysis accuracy is higher in the case of condition 2 or condition 3 in which one of the top note TNm and bottom note BNm is contained in the feature vector xm than in the case of condition 1 in which the feature vector xm includes only the duration feature values dm[1] to dm[12]. In the case of condition 4 (first embodiment and second embodiment) in which both the top note TNm and bottom note BNm are included in the feature vector xm, the analysis accuracy is improved as compared to condition 2 and condition 3.

As described above, the computational load and memory capacity necessary for the learning process decrease as the segmenting number Q of the N reference music pieces increases (as the number Ng of the reference music pieces used to generate one probabilistic model decreases). Furthermore, it is understood from FIGS. 6 and 7 that the analysis accuracy decreases as the segmenting number Q of the N reference music pieces increases. Accordingly, a configuration in which the number Q of the segments is minimized within the limitation of computational performance of the execution processing unit 12 and memory capacity of the storage unit 14 is preferable in the second embodiment.

<Modifications>

Various modifications can be made to each of the above embodiments. The following are specific examples of such modifications. Two or more modifications arbitrarily selected from the following examples may be appropriately combined.

(1) In each of the above embodiments, while the probabilistic model of conditional random fields (CRF) has been exemplified, the form of the probabilistic model is appropriately changed. For example, a known probabilistic model such as hidden Markov model (HMM) can be arbitrarily used.

(2) In each of the above embodiments, while the music titles of reference music pieces are arranged in descending order of evaluation index value SC[n], a method using the analysis result (evaluation index values SC[n]) according to the analysis processor 26 is arbitrary. For example, it is possible to employ a configuration in which the music titles of a predetermined number of reference music pieces, located at the top of the descending order of the evaluation index values SC, from among the N reference music pieces, are displayed to a user, or a configuration (a music search apparatus) in which only the music title of a reference music piece having a maximum evaluation index value SC, from among the N reference music pieces, is displayed to the user.

(3) In each of the above embodiments, while the music analysis apparatus 100 including both the learning processor 24 and the analysis processor 26 is exemplified, it is possible to omit one of the learning processor 24 and the analysis processor 26. That is, the present invention can be implemented as a dedicated apparatus (a probabilistic model generation apparatus in which the analysis processor 26 is not included) which generates a probabilistic model in the learning process by the learning processor 24 or an apparatus (a music analysis apparatus in which the learning processor 24 is not included) which analyzes a correlation between each reference music piece and a designated sequence of notes in the analysis process using the probabilistic model previously stored in the storage unit 14.

(4) The music analysis apparatus 100 can be implemented as a server device which communicates with a terminal device such as a cellular phone, a personal computer, etc. That is, the music analysis apparatus 100 receives the note sequence data DX that represents a sequence of notes, which is designated by a user through an input unit of the terminal device, from the terminal device, computes an evaluation index value SC for each reference music piece, and displays an analysis result through a display unit of the terminal device by transmitting image data representing the analysis result to the terminal device. As is understood from the above description, the input unit 18 and the display unit 16 can be omitted from the music analysis apparatus 100 in each of the above embodiments.

(5) It is possible to use the duration feature values dm[1] to dm[12] in each of the above embodiments for purposes other than music analysis using the probabilistic model. For example, even in a case of analysis (synchronous analysis) of temporal matching between sequences of notes which belong to a common music piece but different tempos and notes, the duration feature values dm[1] to dm[12] are preferably employed. Synchronous analysis using the duration feature values dm[1] to dm[12] can arbitrarily employ a known technology such as dynamic time warping (DTW) represented by dynamic programming (DP) matching, for example.

Considering a first sequence of notes and a second sequence of notes which are represented as time-series data in MIDI format, the feature extractor 22 generates a vector (referred to as a 'duration ratio vector' hereinafter) having the duration feature values dm[1] to dm[12] as elements for each unit period of the first sequence of notes and the second sequence of notes. A synchronous analyzer (now shown) of the execution processing unit 12 computes a distance of the duration ratio vector between the first sequence of notes and the second sequence of notes for all combinations of the unit periods of the first sequence of notes and the unit periods of the second sequence of notes and specifies matching (matching path) between the unit periods of the first sequence of notes and the unit periods of the second sequence of notes such that an accumulated value of distances from start points of the respective notes is minimized.

As is understood from the above description, the present invention is implemented as a note sequence analysis apparatus (or a feature extraction apparatus) for generating a time series of feature values from a sequence of notes. The apparatus is comprised of an acquiring part that acquires a sequence of notes from an external source such as a storage unit 14 or input unit 18, and a feature extractor 22 that divides the sequence of notes (typically, a sequence of notes designated by MIDI time-series data) along a time axis into a plurality of unit periods so as to generate each feature value from each unit period which contains one or more of notes belonging to one or more of pitch classes, the feature extractor calculating each sum of durations of notes belonging to each pitch class in the unit period and a total sum of durations of all notes contained in the unit period, and calculating each ratio of each sum to the total sum as the feature value (a duration feature value dm[c]) of the unit period.

In the note sequence analysis apparatus, purpose of use of the feature values generated by the feature extractor is arbitrary (namely, presence or absence of the learning processor 24 or analysis processor 26 is not the matter).

(6) In each of the above embodiments, while the duration feature values dm[1] to dm[12] for 12 pitch classes respectively corresponding to 12 semi-tones are computed, the number of pitch classes (the number of duration feature values dm[c]) and a method of identifying each pitch class are appropriately changed. For example, it is possible to employ a configuration in which 12 or more (for example, 14, 36 and 48) pitch classes are set or a configuration in which 12 or fewer pitch classes are set. The number of pitch classes can be set in consideration of temperament. Furthermore, it is possible to identify a pitch class for each range. For example, it is possible to employ a configuration in which 12 pitch classes respectively corresponding to 12 semi-tones that belong to each of odd-numbered octaves from among a plurality of octaves are distinguished from 12 pitch classes respectively corresponding to 12 semi-tones that belong to each of even-numbered octaves (and thus a total of 24 duration feature values dm[c] are computed for each unit period F). In addition, it is also possible to individually set 12 pitch classes respectively corresponding to 12 semi-tones within a range (for example, a range of melody) which exceeds a predetermined threshold value and 12 pitch classes respectively corresponding to 12 semi-tones within a range (for example, a range of accompaniment note) (and thus a total of 24 duration feature values dm[c] are computed for each unit period F). As is understood from the above description, a pitch class means a range (category) including at least two pitches having a common note name, and the number of pitch classes and a method of identifying the pitch classes are arbitrary.

(7) Further, the calculation method of the duration feature value dm[c] is not limited to the embodiments disclosed above. For example, it is possible to determine a sum τa of durations of notes belonging to c-th pitch class in a unit period F as the duration feature value dm[c]. Namely, the duration feature value dm[c] is determined based on the sum τa of durations of notes belonging to c-th pitch class in a unit period F. It is not necessary to perform divisional operation (normalization of the duration feature value dm[c]) of each sum τa by total sum τb of durations of all notes contained in the unit period F.

What is claimed is:

1. A music analysis apparatus comprising:
a feature extractor configured to generate a time series of feature values from a sequence of notes which is designated as an object of analysis; and
an analysis processor configured to compute an evaluation index value which indicates a probability that the designated sequence of notes is present in each of a plurality of reference music pieces by applying a probabilistic model to the time series of the feature values generated from the designated sequence of notes, the probabilistic model being generated by machine learning of the plurality of reference music pieces using time series of feature values obtained from the reference music pieces, wherein
the feature extractor is configured to divide the designated sequence of notes along a time axis into a plurality of unit periods so as to generate each feature value from each unit period which contains one or more of notes belonging to one or more of pitch classes, and the feature extractor is configured to calculate each sum of durations of notes belonging to each pitch class in the unit period and configured to calculate the feature value of the unit period based on each sum of durations of notes belonging to each pitch class in the unit period.

2. The music analysis apparatus according to claim 1, wherein the feature extractor is configured to calculate a total sum of durations of all notes contained in the unit period and configured to calculate each ratio of each sum to the total sum as the feature value of the unit period.

3. The music analysis apparatus according to claim 1, wherein the feature extractor is configured to generate the feature value that includes at least one of a pitch of a top note among the one or more of notes contained in the unit period and a pitch of a bottom note among the one or more of notes contained in the unit period.

4. The music analysis apparatus according to claim 1, wherein
the analysis processor is configured to calculate a probability that the notes contained in each unit period appear in each reference music piece, and configured to compute the evaluation index value for each reference music piece by accumulating the probabilities calculated from the plurality of unit periods.

5. The music analysis apparatus according to claim 1, wherein
the plurality of reference music pieces are divided into a plurality of groups and a plurality of probabilistic models are provided in correspondence to the plurality of groups, each probabilistic model being generated by machine learning of the reference music pieces belonging to the corresponding group, and wherein
the analysis processor is configured to compute the evaluation index value for each reference music piece belonging to one group by applying the probabilistic model corresponding to the one group to the time series of the feature values generated from the designated sequence of notes.

6. The music analysis apparatus according to claim 5, wherein the analysis processor is configured to compute the evaluation index values for the plurality of music pieces belonging to the plurality of groups in parallel to each other such that the plurality of probabilistic models corresponding to the plurality of groups are concurrently applied to the time series of the feature values generated from the designated sequence of notes.

7. A feature extraction apparatus for generating a time series of feature values from a sequence of notes, the apparatus comprising:

an acquiring part configured to acquire a sequence of notes from an external source; and a feature extractor configured to divide the sequence of notes along a time axis into a plurality of unit periods so as to generate each feature value from each unit period which contains a plurality of notes belonging to one or more of pitch classes, the feature extractor being configured to calculate each sum of durations of notes belonging to each pitch class in the unit period and being configured to calculate the feature value of the unit period based on each sum of durations of notes belonging to each pitch class in the unit period.

8. The feature extraction apparatus according to claim 7, wherein the feature extractor is configured to calculate a total sum of durations of all notes contained in the unit period and configured to calculate each ratio of each sum to the total sum as the feature value of the unit period.

9. A machine readable non-transitory storage medium for use in a computer, the medium containing program instructions executable by the computer to perform music analysis processing comprising:

acquiring a sequence of notes which is designated as an object of the music analysis processing;

dividing the designated sequence of notes along a time axis into a plurality of unit periods so as to generate each feature value from each unit period which contains one or more of notes belonging to one or more of pitch classes;

calculating each sum of durations of notes belonging to each pitch class in the unit period;

calculating the feature value of the unit period based on each sum of durations of notes belonging to each pitch class in the unit period to thereby generate a time series of the feature values; and computing an evaluation index value which indicates a probability that the designated sequence of notes is present in each of a plurality of reference music pieces by applying a probabilistic model to the time series of the feature values generated from the designated sequence of notes, the probabilistic model being generated by machine learning of the plurality of reference music pieces using time series of feature values obtained from the reference music pieces.

* * * * *